(12) United States Patent
Kim

(10) Patent No.: US 10,896,505 B2
(45) Date of Patent: Jan. 19, 2021

(54) METHOD AND SYSTEM FOR APPLYING FILTERS FOR DENTAL CT IMAGING

(71) Applicant: OSSTEMIMPLANT CO., LTD., Seoul (KR)

(72) Inventor: Sun Jung Kim, Seoul (KR)

(73) Assignee: OSSTEMIMPLANT CO., LTD., Seoul (KR)

( * ) Notice: Subject to any disclaimer, the term of this patent is extended or adjusted under 35 U.S.C. 154(b) by 15 days.

(21) Appl. No.: 16/049,974

(22) Filed: Jul. 31, 2018

(65) Prior Publication Data

US 2019/0043194 A1 Feb. 7, 2019

(30) Foreign Application Priority Data

Aug. 3, 2017 (KR) .................. 10-2017-0098707

(51) Int. Cl.
| | |
|---|---|
| *G06T 7/00* | (2017.01) |
| *G06T 5/00* | (2006.01) |
| *A61C 9/00* | (2006.01) |
| *A61C 3/00* | (2006.01) |
| *G06T 7/11* | (2017.01) |
| *G06T 11/00* | (2006.01) |
| *G06T 5/10* | (2006.01) |
| *G06T 5/20* | (2006.01) |

(52) U.S. Cl.
CPC .............. *G06T 7/0014* (2013.01); *A61C 3/00* (2013.01); *A61C 9/0046* (2013.01); *G06T 5/003* (2013.01); *G06T 5/008* (2013.01); *G06T 5/20* (2013.01); *G06T 7/11* (2017.01); *G06T 11/008* (2013.01); *G06T 2207/10081* (2013.01); *G06T 2207/30036* (2013.01); *G06T 2211/436* (2013.01)

(58) Field of Classification Search
None
See application file for complete search history.

(56) References Cited

U.S. PATENT DOCUMENTS

| 6,704,440 B1* | 3/2004 | Kump ................. G06T 5/20 128/922 |
| 2003/0026390 A1* | 2/2003 | Lutz ................... G06T 5/20 378/210 |
| 2005/0147319 A1* | 7/2005 | Deshpande ............ H04N 19/86 382/268 |

(Continued)

FOREIGN PATENT DOCUMENTS

| JP | 2001-052155 A | 2/2001 |
| KR | 10-1531440 B1 | 6/2015 |

*Primary Examiner* — Mohammed Rachedine
(74) *Attorney, Agent, or Firm* — Novick, Kim & Lee, PLLC; Sang Ho Lee

(57) ABSTRACT

Provided is a method for applying filters for dental CT imaging, including: acquiring the dental CT imaging using a dental CT apparatus; extracting an artifact region from the acquired image; applying a first filter to a region other than the artifact region in the acquired image; and outputting the dental CT imaging to which the filter is applied. Dental CT imaging is provided without an artifact region to assist in medical treatment. More specifically, the dental CT imaging without the artifact region around the metal or tooth is able to be provided to assist in dental treatment. Further, the dental CT imaging without a white artifact region is able to be provided at a boundary portion of field of view (FOV) to assist in dental treatment.

18 Claims, 19 Drawing Sheets

(56) References Cited

U.S. PATENT DOCUMENTS

| | | | | |
|---|---|---|---|---|
| 2007/0019851 A1* | 1/2007 | Nishide | G06T 11/005 | |
| | | | 382/131 | |
| 2010/0322514 A1* | 12/2010 | Koehler | G06T 11/005 | |
| | | | 382/173 | |
| 2011/0075911 A1* | 3/2011 | Xing | G06T 7/12 | |
| | | | 382/131 | |
| 2011/0255765 A1* | 10/2011 | Carlson | A61B 6/14 | |
| | | | 382/131 | |
| 2015/0015572 A1* | 1/2015 | Izumo | A61B 5/055 | |
| | | | 345/419 | |
| 2015/0254816 A1* | 9/2015 | Carlson | A61B 6/4085 | |
| | | | 382/131 | |

\* cited by examiner

METHOD AND SYSTEM FOR APPLYING FILTERS FOR DENTAL CT IMAGING

CROSS-REFERENCE TO RELATED APPLICATION

This application claims the priority and benefit of Korean Patent Application No. 10-2017-0098707 filed on Aug. 3, 2017, with the Korean Intellectual Property Office, the disclosure of which is incorporated herein by reference.

BACKGROUND OF THE INVENTION

1. Field of the Invention

The present invention relates to a method and a system for applying filters for dental CT imaging. More particularly, the present invention relates to a method and a system for reducing artifacts generated when a filter is applied to a cone beam computed tomography (CBCT) image.

2. Description of the Related Art

In general, in dentistry, an X-ray imaging apparatus capable of performing X-ray imaging is used in order to determine states of teeth and alveolar bone for purpose of treating teeth and various periodontal diseases or correcting the teeth.

The X-ray imaging apparatus used in the dentistry photographs a predetermined amount of X-ray to a teeth part of a body part to be photographed, detects the intensity of the transmitted X-ray, and converts the X-ray into an electric signal corresponding to the X-ray intensity and in this case, the computer acquires the intensity of the X-ray of each point in a body imaging region and processes the intensity of the X-ray to acquire an image.

In addition, the acquired image is generally subjected to a process of applying the filter to assist quality improvement and judgment.

In particular, dental CT primarily applies a sharpening filter to show the teeth and structures clearly.

The sharpening filter can brighten bright pixels and darken dark pixels to clearly correct the teeth and the structures, but can create unintended artifact regions.

When the sharpening filter is applied in the dental CT imaging, two types of artifact regions largely arise. A first type is that applying the sharpening filter reduces a gray level on a boundary around metal or tooth, resulting in a black border artifact region. In addition, a second type is that the gray level is small in a boundary region of a field of view (FOV), and when the sharpening filter is applied, a white border artifact region is generated.

The unintended artifact regions are more difficult to apply the sharpening filter because the unintended artifact regions are generated more strongly as the sharpening filter is applied more strongly.

Further, due to the unintentional artifact regions, it is difficult to analyze the CT imaging using the filter.

Therefore, there is a demand for a filter application method and system for eliminating the unintended artifact regions in a dental treatment field to acquire clearer dental CT imaging.

SUMMARY OF THE INVENTION

The present invention has been made in an effort to provide a method for applying a filter so as to prevent artifact regions from being generated in dental CT imaging.

More particularly, the present invention has been made in an effort to provide a method for applying a filter so as to prevent artifact regions from being generated at a boundary around metal or tooth or at a boundary portion of FOV.

An exemplary embodiment of the present invention provides a method for applying filters for dental CT imaging, including: acquiring the dental CT imaging using a dental CT apparatus; extracting an artifact region from the acquired image; applying a first filter to a region other than the artifact region in the acquired image; and outputting the dental CT imaging to which the filter is applied.

The artifact region may be a region having a gray level less than a first value at a boundary of metal or a tooth when the first filter is applied in the acquired dental CT image.

The extracting of the artifact region may further include applying a second filter in the acquired image.

The extracting of the artifact region may further include inverting a gray level of an image to which a second filter is applied.

The extracting of the artifact region may further include, when the gray level of a pixel is less than a second value in the inverted image, changing the gray level of the pixel to a minimum value.

In the extracting of the artifact region, when the gray level of a pixel is equal to or more than the second value in the inverted image, a region of the pixel may be determined as the artifact region.

The artifact region may be a region having a gray level exceeding a third value at the boundary of field of view (FOV) when the first filter is applied in the acquired image.

The extracting of the artifact region may further include applying a third filter in the acquired image.

The extracting of the artifact region may further include inverting the gray level of an image to which the third filter is applied.

The extracting of the artifact region may further include, when the gray level of a pixel is less than a fourth value in the inverted image, changing the gray level of the pixel to a minimum value.

In the extracting of the artifact region, when the gray level of a pixel is equal to or more than the fourth value in the inverted image, a region of the pixel may be determined as the artifact region.

Another exemplary embodiment of the present invention provides a system for applying filters for dental CT imaging, including: an image acquisition unit acquiring the dental CT imaging using a dental CT apparatus; an extraction unit extracting an artifact region; a filter unit applying a filter in the acquired image; and outputting the dental CT imaging to which the filter is applied, and the filter unit may apply a first filter to a region other than the artifact region in the acquired image.

The filter unit may apply a second filter in the acquired image.

The extraction unit may invert the gray level of the image to which the second filter is applied and when the gray level of a pixel is less than a second value in the inverted image, the extraction unit may change the gray level of the pixel to a minimum value.

The filter unit may apply a third filter in the acquired image.

The extraction unit may invert the gray level of the image to which the third filter is applied and when the gray level of a pixel is less than a fourth value in the inverted image, the extraction unit may change the gray level of the pixel to the minimum value.

DETAILED DESCRIPTION

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

The above-mentioned objects, features, and advantages will become more obvious from the following detailed description associated with the accompanying drawings. Therefore, those skilled in the art to which the present invention pertains may easily practice a technical idea of the present invention.

Further, in describing the present invention, in the case in which it is decided that a detailed description of a well-known technology associated with the present invention may unnecessarily make the gist of the present invention unclear, it will be omitted. Hereinafter, exemplary embodiments of the present invention will be described in detail with reference to the accompanying drawings.

Figure 1:
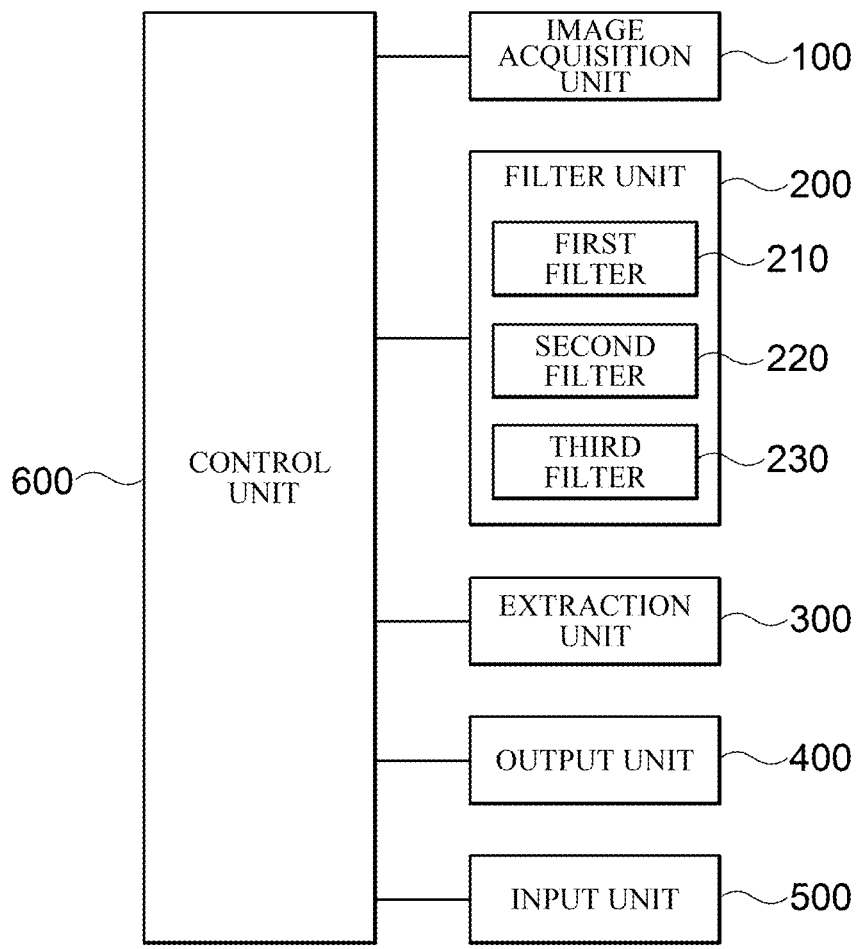
FIG. 1 is a block diagram illustrating a system for applying filters for dental CT imaging according to an exemplary embodiment of the present invention.

FIG. 1 is a block diagram illustrating a system for applying filters for dental CT imaging according to an exemplary embodiment of the present invention.

Referring to FIG. 1, a system for applying filters for dental CT imaging may include an image acquisition unit 100, a filter unit 200, an output unit 400, an input unit 500, and a control unit 600.

The image acquisition unit 100 may serve to acquire the dental CT imaging using a dental computed tomography (CT) apparatus.

Here, a dental CT apparatus may include all CT apparatuses capable of acquiring CT images. Preferably, the dental CT apparatus is a cone beam computed tomography (CBCT) apparatus.

In addition, the dental CT imaging acquired by the image acquisition unit 100 may be 2D (Dimensional), 3D, or 4D. Further, the dental CT imaging acquired by the image acquisition unit 100 may have a bit value of 2 bits, 4 bits, 8 bits, 16 bits, or the like per pixel.

Hereinafter, the present invention will be described on the basis of dental CT imaging having a 16-bit value per 2D and a pixel.

The filter unit 200 may serve to apply a filter in the dental CT imaging acquired by the image acquisition unit 100. In addition, the filter unit 200 may apply the filter by selecting the entire region or a partial region of the acquired dental CT imaging.

The filter unit 200 may include a first filter 210, a second filter 220, and a third filter 230.

The first filter 210 as a filter for sharpening teeth and a structure may adopt a high pass filter for passing only a high frequency. Here, the high frequency is referred to as a case where a change in pixel in an image region is larger than a predetermined reference.

Further, preferably, a sharpening filter in the high pass filter may be used. Here, the sharpening filter may be a matrix of 3×3, 4×4, 5×5, and so on. Preferably, a sharpening filter having a 3×3 matrix is used. For example, the sharpening filter with the 3×3 matrix may have a matrix value of (0, −1, 0; −1, 5, −1; 0, −1, 0), (−1, −1, −1; −1−1, 9, −1; −1, −1, −1), or (1, −2, 1; −2, 5, −2; 1, −2, 1). In addition, the first filter 210 is not limited to the above-described example and may include any type of filter for sharpening the teeth and structures.

Further, the second filter 220 as a filter for finding a boundary around the metal or the tooth may adopt a Laplacian filter capable of emphasizing the boundary. Here, the Laplacian filter may be a matrix of 3×3, 4×4, 5×5, and so on. Preferably, a Laplacian filter having a 3×3 matrix is used. As the aforementioned example, the Laplacian filter with the 3×3 matrix may have a matrix value of (0, 1, 0; 1, −4, 1; 0, 1, 0), (0, −1, 0; −1, 4, −1; 0, −1, 0), (1, 1, 1; 1, −8, 1; 1, 1, 1), or (−1, −1, −1; −1, 8, −1; −1, −1, −1). Preferably, a Laplacian filter having a matrix value of (−1, −1, −1; −1, 8, −1; −1, −1, −1) is used. In addition, the second filter 220 is not limited to the above-described example and may include any type of filter capable of emphasizing the boundary around the metal or the teeth.

Further, the third filter 230 as a filter for finding a region of the boundary of the field of view (FOV) may adopt the sharpening filter. Here, the sharpening filter with a strong sharp effect is used. Preferably, a sharpening filter having a matrix value of (0, −1, 0; −1, 5, −1; 0, −1, 0) is used. Further, the third filter 230 may also include any type filter for finding the region of the boundary of the field of view (FOV). Here, the boundary of the field of view (FOV) means a boundary between an examinee and an air region.

The extraction unit 300 may serve to extract the artifact region from the acquired dental CT imaging.

Here, the artifact region means a region having a gray level less than a first value at the boundary of the metal or tooth when the first filter is applied in the acquired dental CT imaging. Here, when the range of the gray level is from 0 to 65535, the first value may be a value of about 15000. Further, the first value may be set to a different value depending on the gray level or the dental CT imaging.

In addition, the artifact region means a region having a gray level exceeding a third value at the boundary of the field of view (FOV) when the first filter is applied in the acquired dental CT image. Here, when the range of the gray level is from 0 to 65535, the third value may be a value of about 55000. Further, the third value may be set to a different value depending on the gray level.

In addition, the extraction unit 300 may invert the gray level of the dental CT imaging to which the second filter 220 is applied. Here, the inversion of the gray level means that a positive sign of the gray level is changed to a negative sign and the negative sign is changed to the positive sign. That is, the inversion of the gray level means multiplying the gray level by a negative number. For example, the extraction unit 300 may change the gray level to −30 and −150 if the gray level is 30 and 150 and changes the gray level to 10 and 20 if the gray level is −10 and −20. In addition, the extraction unit 300 may invert the gray level of the dental CT imaging to which the third filter is applied. The extraction unit 300 inverts the gray level so that the user of the present invention has an effect of visually confirming the artifact region with the naked eye.

Further, when the gray level of the pixel in the inverted dental CT imaging is less than a second value, the extraction unit 300 may change the gray level of the pixel to a minimum value. Here, the minimum value means a lowest gray level among the gray levels of the pixels of the acquired image. Further, when the gray level of the pixel in the inverted dental CT imaging is less than a fourth value, the extraction unit 300 may change the gray level of the pixel to the minimum value. Here, preferably, the second value may be 2000 and the fourth value may be 1. In addition, the second value or the fourth value may vary depending on various situations.

In addition, the extraction unit 300 unifies the gray level of a portion other than the artifact region to the minimum value, and as a result, only the artifact region is displayed. Accordingly, the user of the present invention may easily confirm the artifact region with the naked eye.

Further, when the gray level of the pixel in the inverted dental CT imaging is equal to or more than the second value or the fourth value, the extraction unit 300 may maintain the gray level of the pixel in the inverted dental CT imaging as it is.

Meanwhile, when the gray level of the pixel in the inverted dental CT imaging is equal to or more than the second value or the fourth value, the extraction unit 300 may determine the region of the pixel as the artifact region. Further, the extraction unit 300 may extract the region determined as the artifact region. That is, the extraction unit 300 may extract a region in which the gray level is not the minimum value as the artifact region. In addition, the filter unit 200 may apply the first filter 210 in the dental CT imaging excluding the extracted artifact region.

Further, when there is no region in which the gray level of the pixel is equal to or more than the second value or the fourth value in the inverted dental CT imaging, the extraction unit 300 may determine that there is no artifact region in the acquired image. In addition, when the extraction unit 300 determines that there is no artifact region, the filter unit 200 may apply the first filter 210 to all regions of the acquired image.

The output unit 400 may serve to output the dental CT imaging to which the filter is applied. That is, the output unit 400 may output dental CT imaging in which the filter is applied to a part or an entire region.

Further, the output unit 400 may display a current progress situation or an intermediate result of the extraction unit 300 or the filter unit 200. For example, the output unit 400 may display the dental CT imaging having the gray level inverted by the extraction unit 300 and the output unit 400 may display the dental CT imaging to which the second filter 220 is applied by the filter unit 200. The output unit 400 outputs the dental CT imaging to which the filter is applied to provide dental CT imaging having improved sharpness to the user.

Further, the output unit 400 may output a sound. When the extraction unit 300 may not extract the artifact region, the output unit may output a warning sound.

The input unit 500 serves to receive a control input from the user.

Here, based on the received control input, the filter unit 200 may determine whether to apply the filter in the acquired dental CT imaging. Further, the filter unit 200 may selectively apply the first filter 210, the second filter 220, or the third filter 230 based on the received control input.

The control unit 600 controls the image acquisition unit 100, the filter unit 200, the output unit 400, or the extraction unit 300 to perform a method for applying filters for dental CT imaging of the present invention.

Next, a flow of the present invention will be described with reference to FIGS. 2 to 4.

Figure 2:
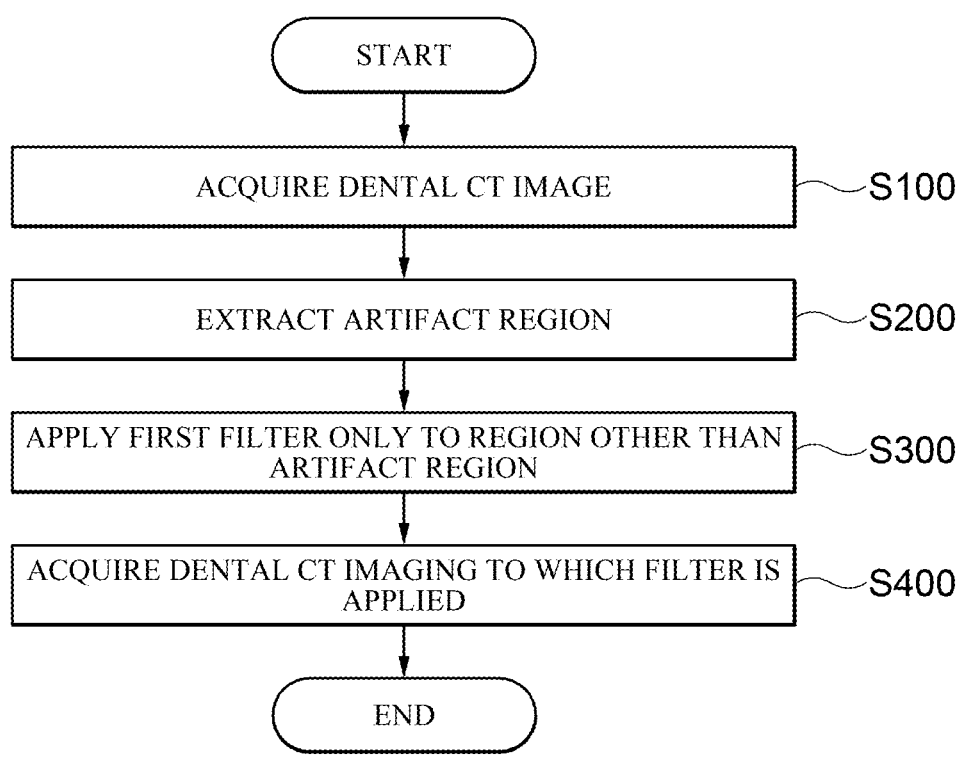
FIG. 2 is a flowchart illustrating a method for applying filters according to an exemplary embodiment of the present invention.

FIG. 2 is a flowchart illustrating a method for applying filters according to an exemplary embodiment of the present invention.

Referring to FIG. 2, an image acquisition unit 100 may acquire dental CT imaging using a dental computed tomography (CT) apparatus (S100). Here, preferably, the dental CT apparatus is a CBCT apparatus.

In addition, an extraction unit 300 may extract an artifact region from the acquired dental CT imaging (S200).

In addition, a filter unit 200 may apply a first filter 210 to a region excluding the artifact region.

In applying the first filter 210 only in the region excluding the artifact region (S300), when the extraction unit 300 determines that there is no artifact region, the filter unit 200 may apply the first filter 210 to an entire region of the acquired dental CT imaging.

In addition, an output unit 400 may output dental CT imaging to which a filter is applied (S400). Here, the dental CT imaging is an image in which the filter is applied to a partial region or the entire region.

In the outputting (S400), the output unit 400 may display a progress situation of the extraction unit 300 or the filter unit 200. For example, the output unit 400 may output dental CT imaging having a gray level inverted by the extraction unit 300. Further, for example, the output unit 400 may output dental CT imaging to which a second filter 220 is applied by the filter unit 200.

Next, the extracting of the artifact region (S200) will be described in more detail with reference to FIGS. 3 and 4.

Figure 3:
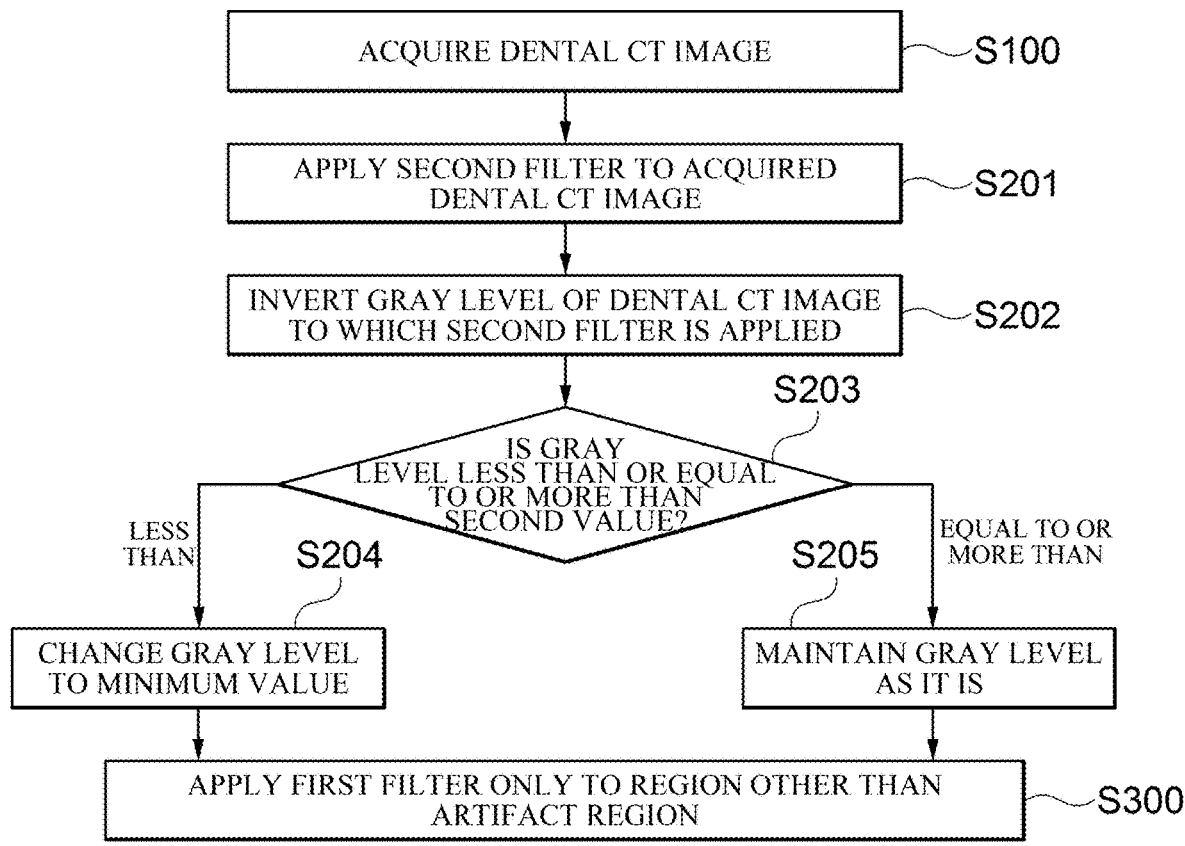
FIGS. 3 and 4 are flowcharts more specifically illustrating the method for applying filters according to an exemplary embodiment of the present invention.
Figure 4:
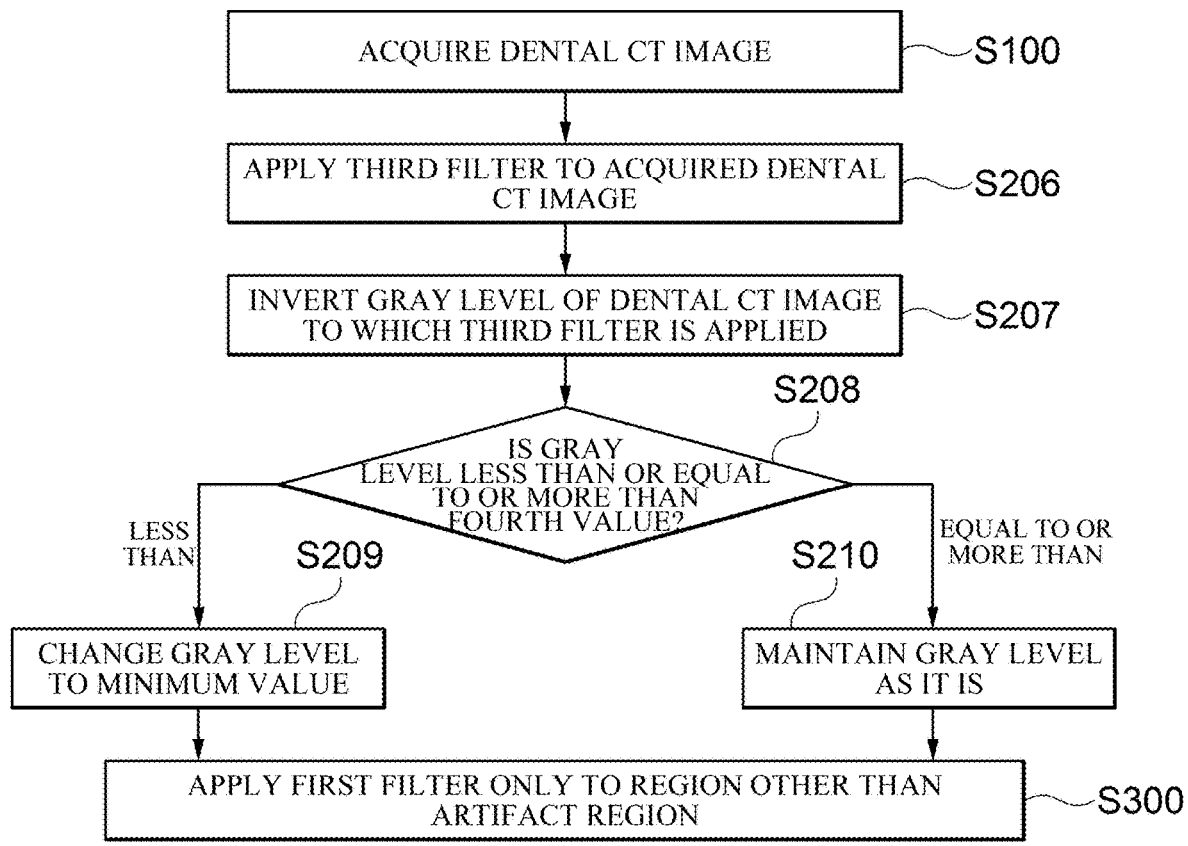

FIGS. 3 and 4 are flowcharts more specifically illustrating the method for extracting the artifact region according to an exemplary embodiment of the present invention.

Referring to FIG. 3, the filter unit 200 may apply the second filter 220 in the acquired dental CT imaging (S201). Here, the filter unit 200 applies the second filter 220 in the acquired dental CT imaging to emphasize a boundary of metal or tooth. Here, the second filter 220 may adopt any filter capable of emphasizing the boundary of the metal or tooth and preferably, adopts a Laplacian filter.

In addition, the extraction unit 300 may invert the gray level of the dental CT imaging to which the second filter 220 is applied (S202). Here, the inversion of the gray level means that a positive sign of the gray level is changed to a negative sign and the negative sign is changed to the positive sign.

Here, the output unit 400 outputs the dental CT imaging with the inverted gray level, so that a user may clearly confirm the artifact area with the naked eye.

In addition, the extraction unit 300 may determine whether the gray level of the pixel is less than or equal to or more than a second value in the inverted dental CT imaging (S203). Here, the second value may vary depending on the dental CT imaging and preferably, the second value is 2000.

When the gray level of the pixel is less than the second value in the determining of the gray level (S203), the extraction unit 300 may change the gray level of the pixel to a minimum value (S204). Here, the minimum value of the gray level means a lowest gray level in the corresponding dental CT imaging.

Further, when the gray level of the pixel is equal to or more than the second value in the determining of the gray level (S203), the extraction unit 300 may maintain the gray level of the pixel as it is (S205). That is, the extraction unit 300 changes the gray level of the region other than the artifact to the minimum value, and as a result, the user may clearly confirm the artifact region with the naked eye.

Further, referring to FIG. 4, the filter unit 200 may apply a third filter 230 in the acquired dental CT imaging (S206). Here, the filter unit 200 applies the third filter 230 in the acquired dental CT imaging to emphasize a boundary of field of view (FOV). Here, the third filter 230 may adopt any filter capable of emphasizing the boundary of the field of view (FOV) and preferably, adopts a sharpening filter having a strong sharp effect.

In addition, the extraction unit 300 may invert the gray level of the dental CT imaging to which the third filter 230 is applied (S207). Here, the output unit 400 outputs the dental CT imaging with the inverted gray level, so that the user may clearly confirm the artifact area with the naked eye.

The extraction unit 300 may determine whether the gray level of the pixel is less than or equal to or more than a fourth value in the inverted dental CT imaging (S208). Here, the fourth value may vary depending on the dental CT imaging and preferably, the fourth value is 1.

When the gray level of the pixel is less than the fourth value in the determining of the gray level (S208), the extraction unit 300 may change the gray level of the pixel to a minimum value (S209).

Further, when the gray level of the pixel is equal to or more than the fourth value in the determining of the gray level (S208), the extraction unit 300 may maintain the gray level of the pixel as it is (S210).

Meanwhile, the output unit 400 may output the dental CT imaging in all steps described above. In addition, the user may omit some of the steps described above through the input unit 500. For example, when dental CT imaging without the boundary of the field of view (FOV) is acquired, the extraction unit 300 may omit the applying of the third filter 230 (S206) to the maintaining of the gray level of the pixel (S210). Therefore, resources of a system may be efficiently used.

Meanwhile, referring to FIGS. 5A to 6C, the steps will be described through step-by-step exemplary diagrams according to an exemplary embodiment of the present invention.

Figure 5A:
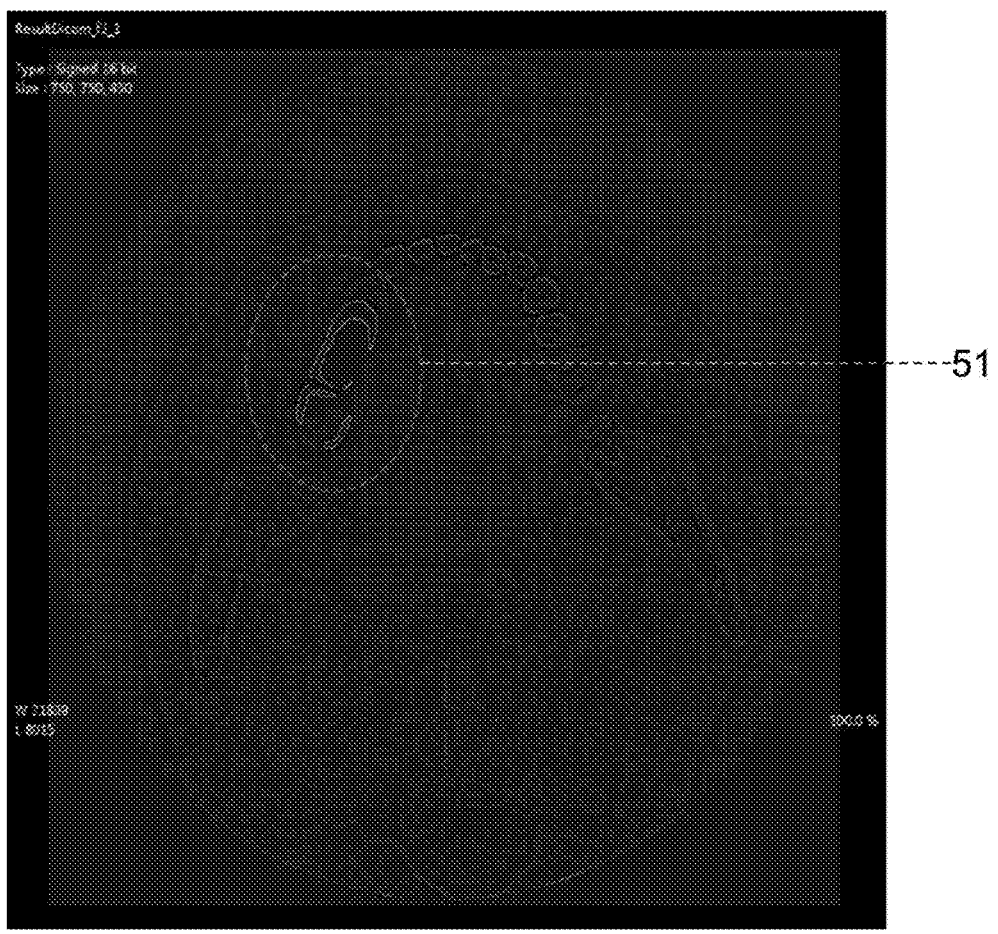
FIGS. 5A to 5C are exemplary diagrams illustrating a step of extracting an artifact region according to an exemplary embodiment of the present invention.
Figure 5B:
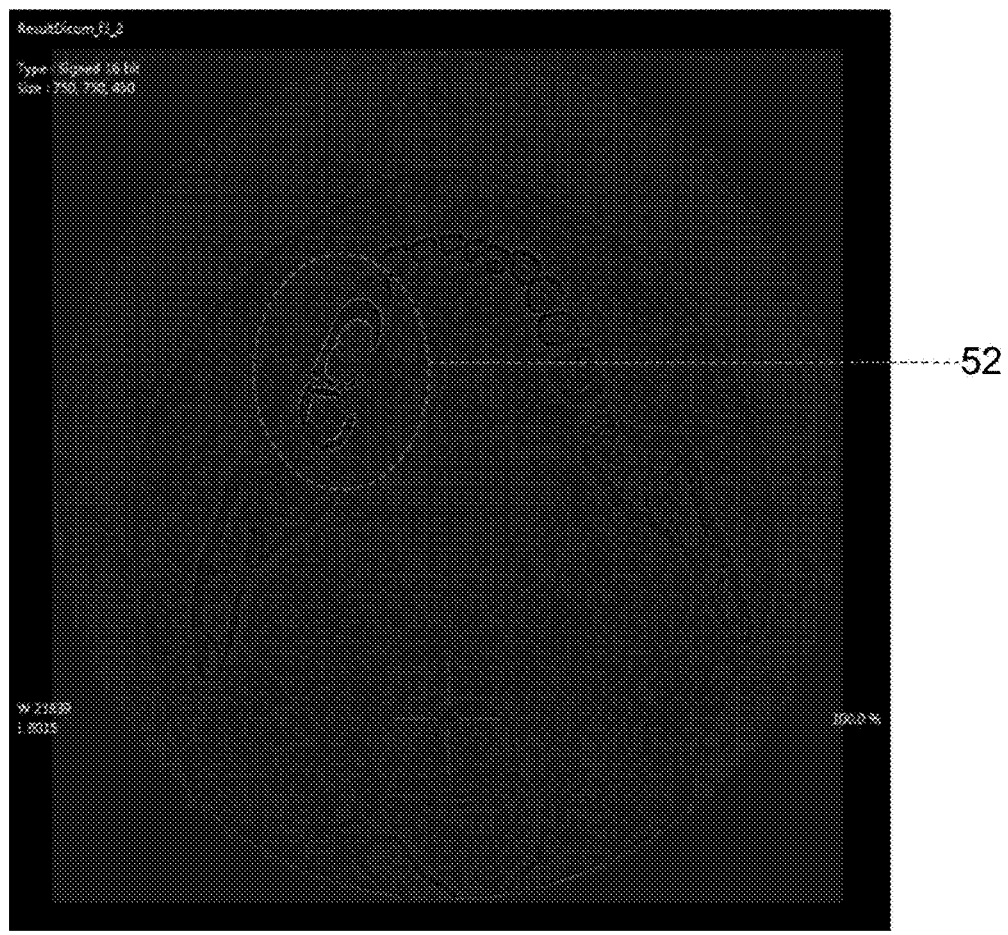
Figure 5C:
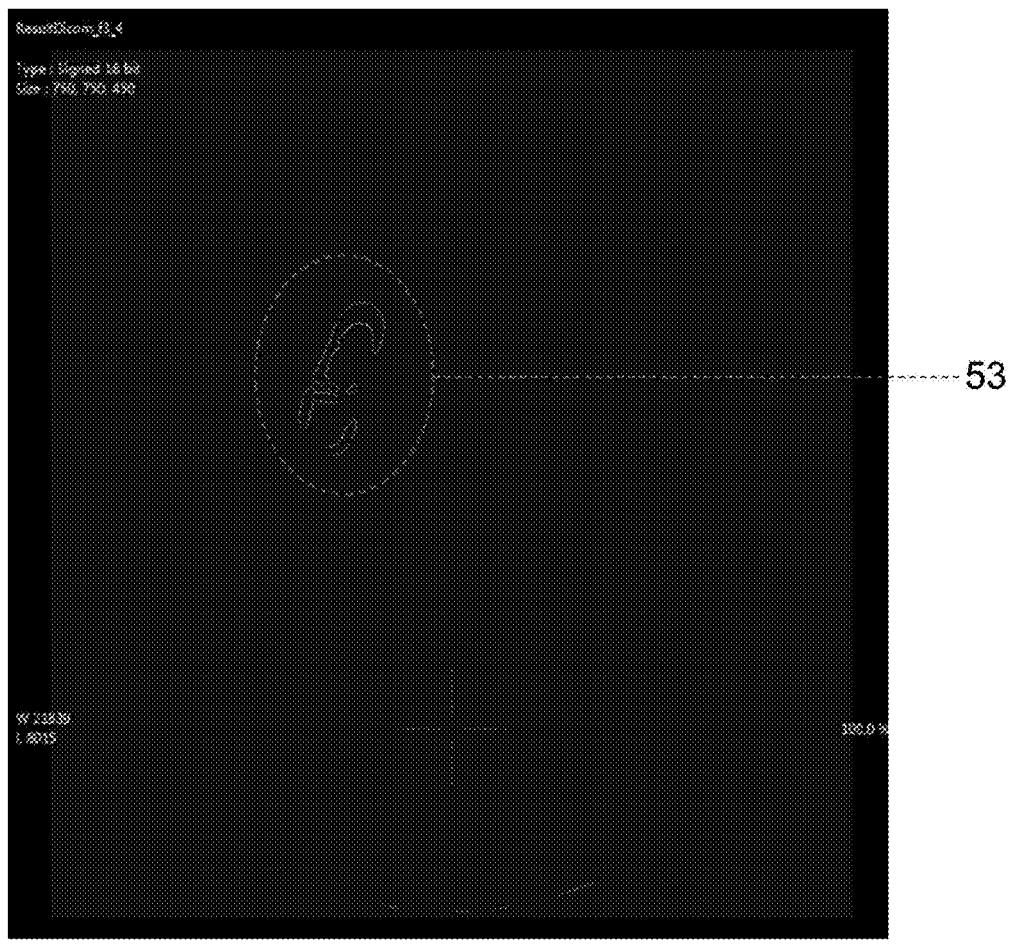

FIGS. 5A to 5C are exemplary diagrams illustrating a step of extracting an artifact region according to an exemplary embodiment of the present invention.

FIG. 5A is an exemplary diagram in which the second filter 220 is applied in the acquired dental CT imaging. That is, FIG. 5A illustrates the dental CT imaging subjected to the applying of the second filter 220 (S201). Referring to a region 51 of FIG. 5A, the user may see that a black border artifact region occurs at the boundary of the metal or tooth.

FIG. 5B is an exemplary diagram in which the extraction unit 300 inverts the gray level of the dental CT imaging to which the second filter 220 is applied. That is, FIG. 5B illustrates dental CT imaging subjected to the inverting of the gray level (S202). Here, referring to a region 52 of FIG. 5B, the user may see that the black border artifact region is inverted at the boundary of the metal or tooth.

FIG. 5C is an exemplary diagram in which when the gray level of the pixel is less than the second value, the extraction unit 300 changes the gray level of the pixel to the minimum value and when the gray level of the pixel is equal to or more than the second value, the extraction unit 300 maintains the gray level of the pixel as it is. That is, the exemplary diagram illustrates dental CT imaging subjected to the determining of the gray level (S203), the changing of the gray level to the minimum value (S204), and the maintaining the gray level of the pixel as it is (S205). Referring to a region 53 of FIG. 5C, the user may clearly confirm the artifact region with the naked eye and also confirm whether the artifact region is properly extracted.

Further, in FIGS. 5A to 5C, the applying of the second filter (S201) to the maintaining of the gray level of the pixel as it is (S205) are performed to extract the artifact region, but the extraction unit 300 further performs the applying of the third filter (S206) to the maintaining of the gray level of the pixel as it is (S210) additionally to further extract the artifact region.

Further, the output unit 400 may output the dental CT imaging in FIGS. 5A to 5C. The user may confirm whether the artifact region is correctly extracted based on the output dental CT imaging.

Figure 6A:
FIGS. 6A to 6C are exemplary diagrams illustrating a step of extracting an artifact region according to an exemplary embodiment of the present invention.
Figure 6B:
Figure 6C:
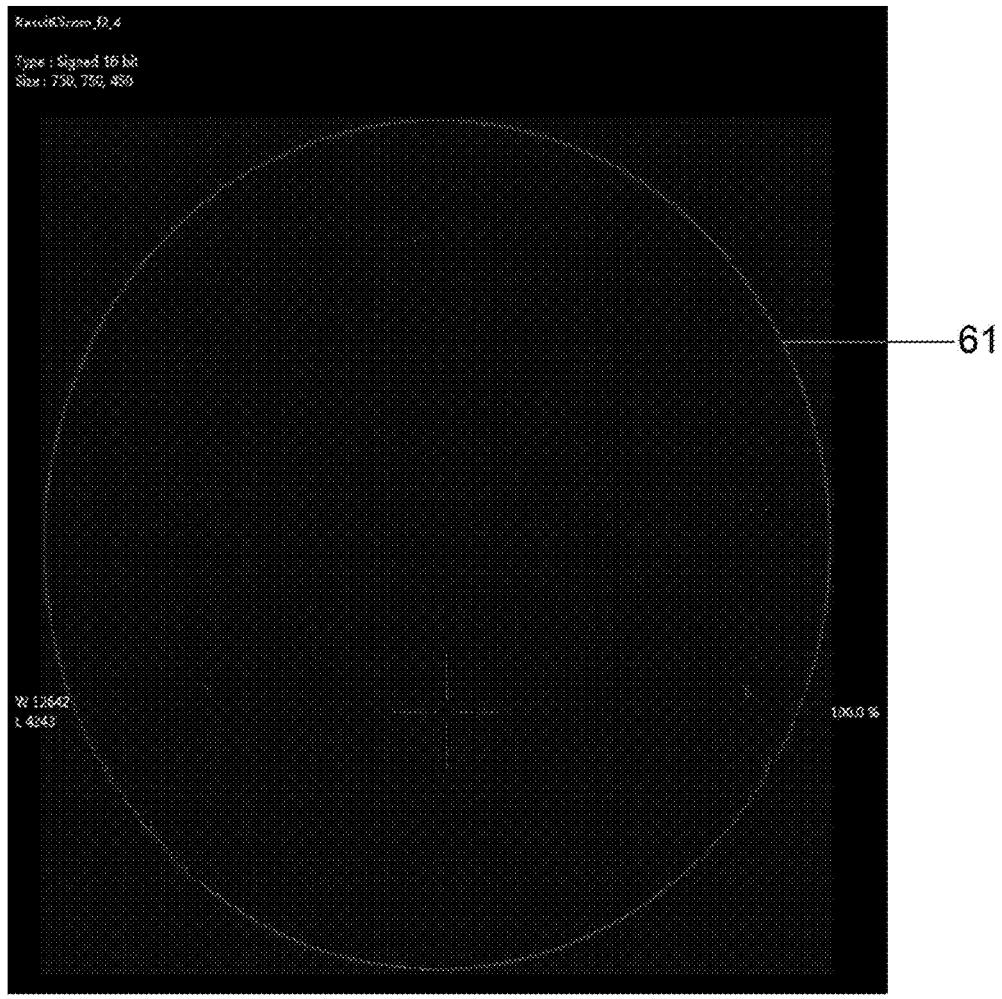

FIGS. 6A to 6C are exemplary diagrams illustrating a step of extracting an artifact region according to an exemplary embodiment of the present invention.

FIG. 6A is an exemplary diagram in which the filter unit 200 applies the third filter 230 in the acquired dental CT imaging. That is, the exemplary diagram illustrates the dental CT imaging subjected to the applying of the third filter (S206).

FIG. 6B is an exemplary diagram in which the extraction unit 300 inverts the gray level of the dental CT imaging to which the third filter 230 is applied. That is, the exemplary diagram illustrates the dental CT imaging subjected to the inverting of the gray level (S207).

FIG. 6C is an exemplary diagram in which when the gray level of the pixel is less than the fourth value, the extraction unit 300 changes the gray level of the pixel to the minimum value and when the gray level of the pixel is equal to or more than the fourth value, the extraction unit 300 maintains the gray level of the pixel as it is. That is, the exemplary diagram illustrates dental CT imaging subjected to the determining of the gray level (S208), the changing of the gray level to the minimum value (S209), and the maintaining the gray level of the pixel as it is (S210). Here, referring to a region 61 of FIG. 6C, the user may clearly confirm the artifact region generated at the boundary of the field of view (FOV) with the naked eye.

Further, in FIGS. 6A to 6C, the applying of the third filter (S206) to the maintaining of the gray level of the pixel as it is (S210) are performed to extract the artifact region, but the extraction unit 300 further performs the applying of the second filter (S201) to the maintaining of the gray level of the pixel as it is (S205) additionally to further extract the artifact region.

Hereinafter, the related art and the present invention will be compared and described with reference to FIGS. 7A to 9C.

Figure 7A:
FIG. 7A is an exemplary diagram of dental CT imaging before applying filters according to an exemplary embodiment of the present invention.

FIG. 7A is an exemplary diagram of dental CT imaging before applying filters according to an exemplary embodiment of the present invention.

Figure 7B:
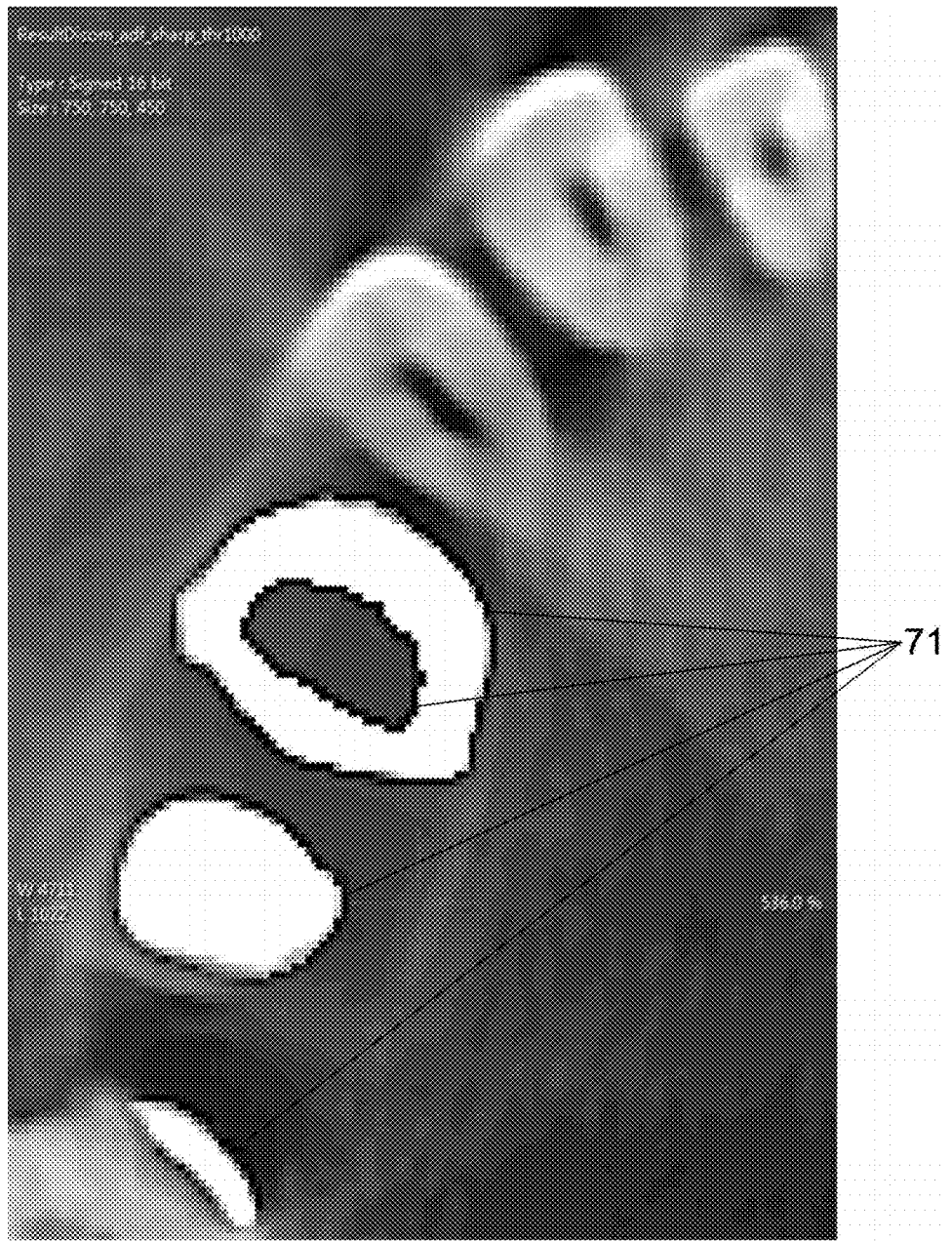
FIG. 7B is an exemplary diagram of dental CT imaging after applying filters in the related art.

FIG. 7B is an exemplary diagram of dental CT imaging after applying filters in the related art.

Figure 7C:
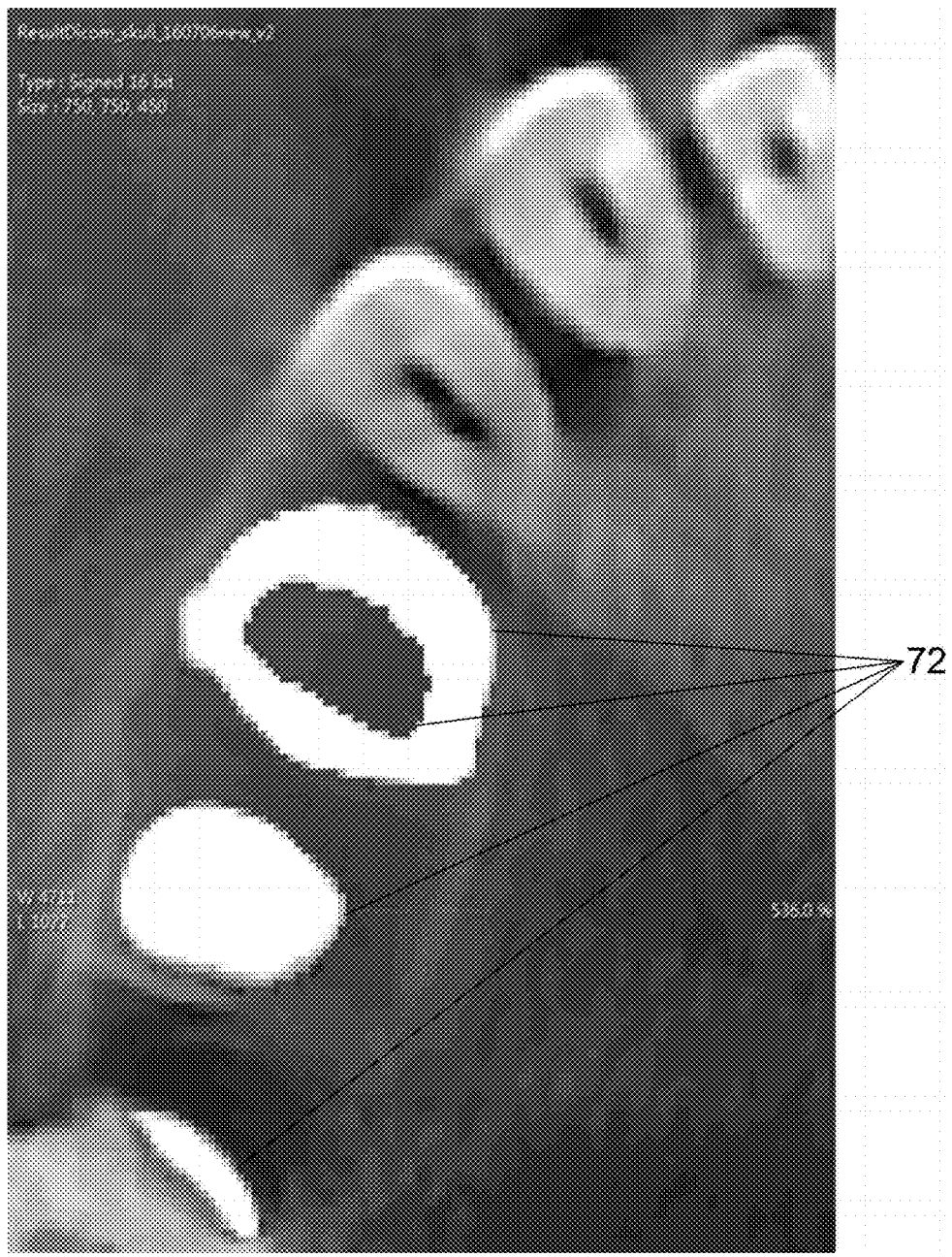
FIG. 7C is an exemplary diagram of dental CT imaging after applying filters according to an exemplary embodiment of the present invention.

FIG. 7C is an exemplary diagram of dental CT imaging after applying filters according to an exemplary embodiment of the present invention.

Referring to FIG. 7A, the image acquisition unit 100 may acquire the dental CT imaging using the dental CT apparatus. Applying the sharpening filter in the related art here results in the black border artifact region at the boundary of the metal or tooth as in a region 71 of FIG. 7B. Due to such an artifact region, the user has a difficulty in analyzing the dental CT imaging.

However, when the filter according to an exemplary embodiment of the present invention is applied, dental CT imaging in which the black border artifact region disappears as in a region 72 of FIG. 7C may be acquired. More specifically, the exemplary diagram of FIG. 7C illustrates dental CT imaging subjected to the extracting of the artifact region (S200) including the applying of the second filter (S201) to the maintaining of the gray level of the pixel (S205) and applying the first filter 210 only in the region other than the artifact region (S300).

In addition, according to an exemplary embodiment of the present invention, it is possible to save the resources of the system by applying the first filter in the region other than the region in which the artifact occurs.

Figure 8A:
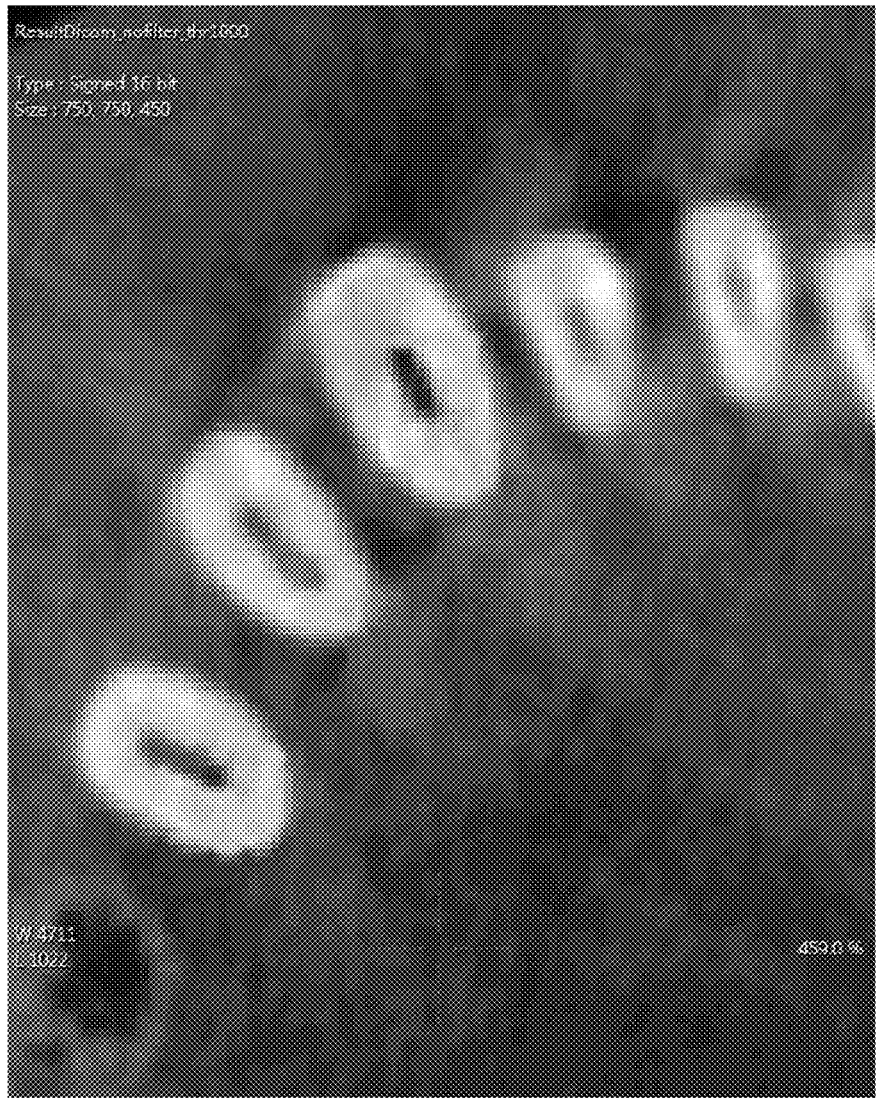
FIG. 8A is an exemplary diagram of dental CT imaging before applying filters according to an exemplary embodiment of the present invention.

FIG. 8A is an exemplary diagram of dental CT imaging before applying filters according to an exemplary embodiment of the present invention.

Figure 8B:
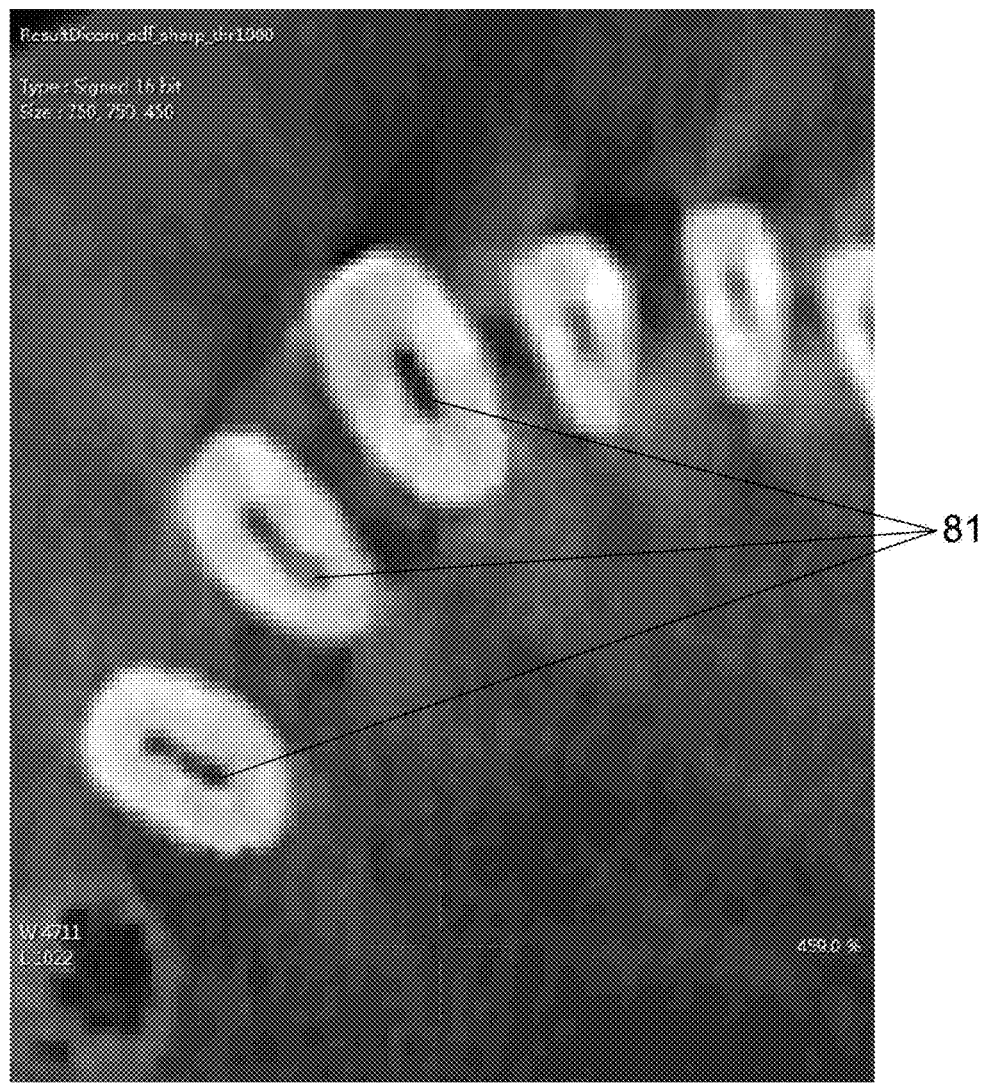
FIG. 8B is an exemplary diagram of dental CT imaging after applying filters in the related art.

FIG. 8B is an exemplary diagram of dental CT imaging after applying filters in the related art.

Figure 8C:
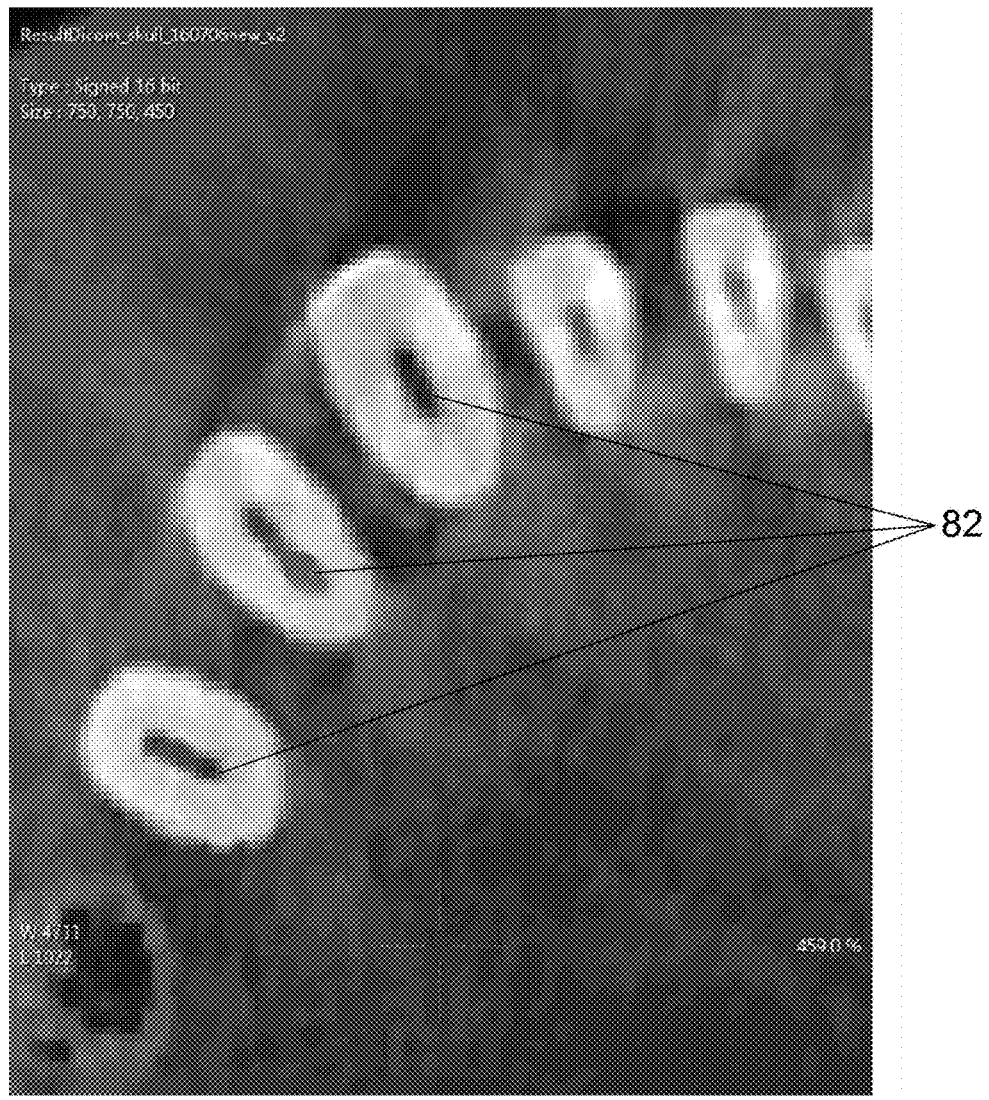
FIG. 8C is an exemplary diagram of dental CT imaging after applying filters according to an exemplary embodiment of the present invention.

FIG. 8C is an exemplary diagram of dental CT imaging before applying filters according to an exemplary embodiment of the present invention.

FIGS. 8A to 8C are diagrams illustrating an example of generation of a filter-applied dental CT imaging according to the prior art and the present invention when the artifact region does not exist. That is, unlike FIG. 7A, the artifact regions may not exist in the dental CT imaging in some cases.

In this case, the extracting of the artifact region (S200) may be omitted, so that even if the method according to the present invention is applied, the same result as the related art may be acquired.

Specifically, when FIGS. 8B and 8C are compared with each other, FIG. 8B illustrates an example of applying the sharpening filter without the separate step of the extracting the separate artifact region (S200) and is the same as the dental CT imaging of FIG. 8C to which the filter is applied according to the present invention. In particular, even in tooth boundary regions 81 and 82 of the dental CT imaging to which the filter is applied, the same result may be achieved. That is, in the present invention, a stable result may be acquired even in the dental CT imaging without the artifact region.

Figure 9A:
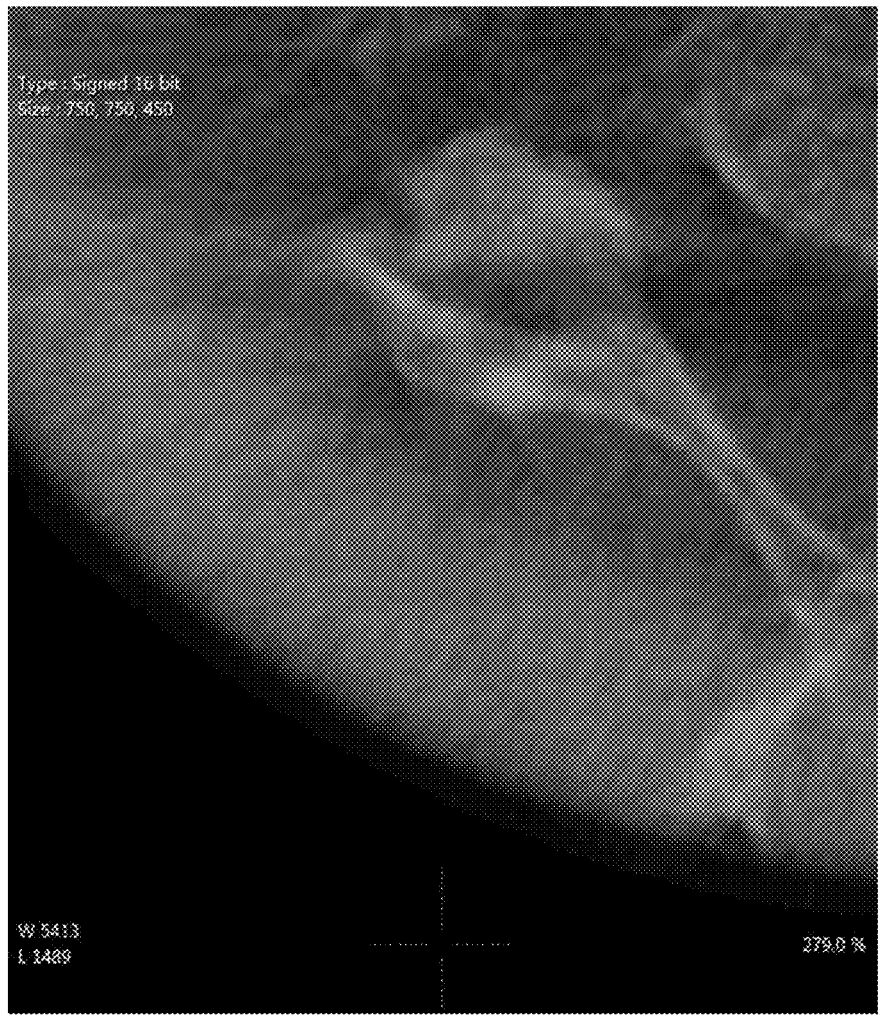
FIG. 9A is an exemplary diagram of dental CT imaging before applying filters according to an exemplary embodiment of the present invention.

FIG. 9A is an exemplary diagram of dental CT imaging before applying filters according to an exemplary embodiment of the present invention.

Figure 9B:
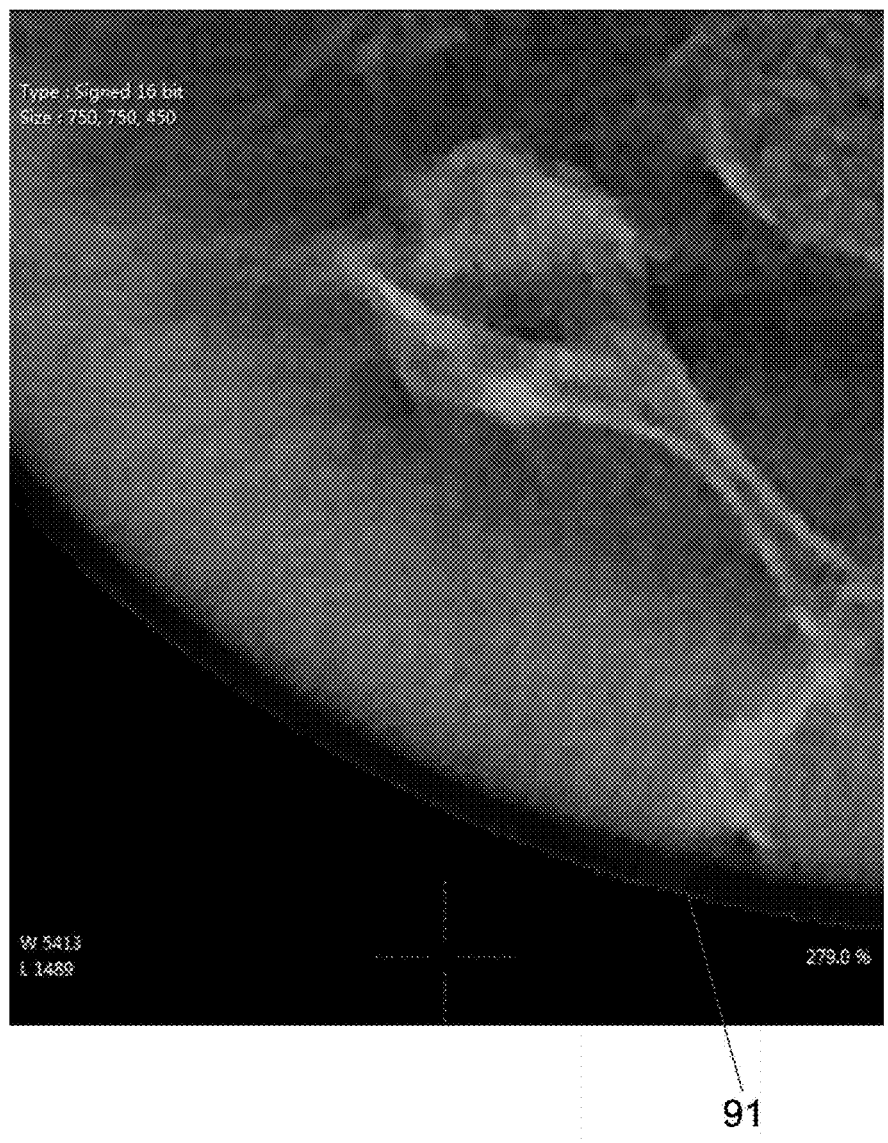
FIG. 9B is an exemplary diagram of dental CT imaging after applying filters in the related art.

FIG. 9B is an exemplary diagram of dental CT imaging after applying filters in the related art.

Figure 9C:
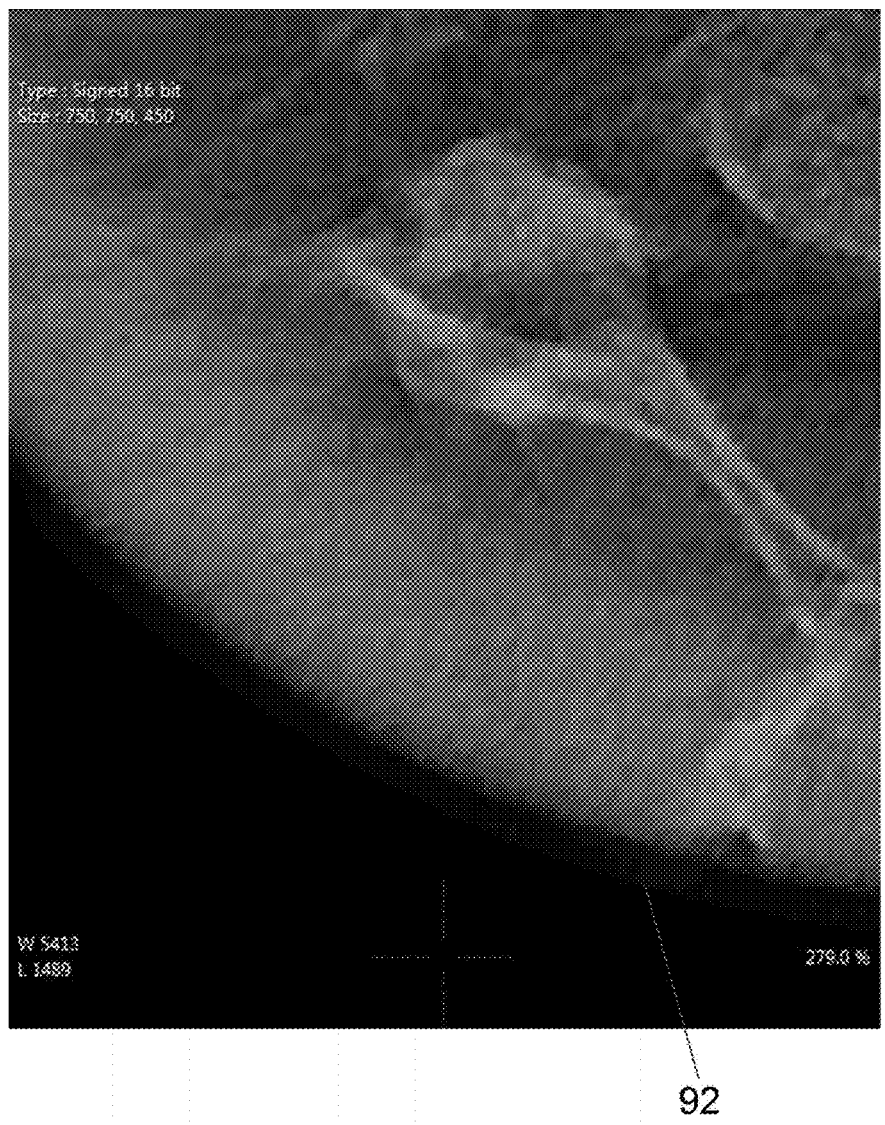
FIG. 9C is an exemplary diagram of dental CT imaging before applying filters according to an exemplary embodiment of the present invention.

FIG. 9C is an exemplary diagram of dental CT imaging after applying filters according to an exemplary embodiment of the present invention.

Referring to FIG. 9A, the image acquisition unit 100 may acquire the dental CT imaging using the dental CT apparatus. Applying the sharpening filter in the related art here results in a white band-shaped artifact region in the region of the FOV boundary as in a region 91 of FIG. 9B. Due to such an artifact region, the user has difficulty in analyzing the dental CT imaging.

However, when the filter according to an exemplary embodiment of the present invention is applied, the dental CT imaging without the artifact region as in a region 92 of FIG. 9C may be acquired.

According to the exemplary embodiment of the present invention, the method and the system for applying filters for dental CT imaging have the effect that the artifact region does not occur even when the sharpening filter is applied. More specifically, in the present invention, the region where the artifact occurs is extracted from the dental CT imaging and the first filter 210 is applied only in the region other than the corresponding region. In this case, there is an effect that the artifact region is not generated. In addition, since the first filter 210 is applied only to a part of the region, the resources of the system may be saved. Further, the output unit 400 outputs the dental CT imaging in the outputting of the filter-applied dental CT imaging (S300) from the extracting of the artifact region (S200), and as a result, the user may confirm whether the filter is correctly applied. Moreover, by applying a filter in the region other than the region where the artifact occurs, the filter unit 200 may apply the stronger filter in the dental CT imaging.

The present invention provides dental CT imaging without an artifact region to assist in medical treatment.

More particularly, the dental CT imaging without the artifact region around the metal or tooth can be provided to assist in dental treatment.

Further, the dental CT imaging without the artifact region can be provided at a boundary portion of field of view (FOV) to assist in dental treatment.

In addition, by applying a filter in a region other than a region where the artifact is generated, system resources can be saved, and a filter unit can apply a stronger filter in the dental CT imaging.

In addition, a user can confirm an extracted artifact region through an output unit and confirm whether the filter is correctly applied in the dental CT imaging.

The above description just illustrates the technical spirit of the present invention and various changes, modifications, and substitutions can be made by those skilled in the art to which the present invention pertains without departing from an essential characteristic of the present invention.

Therefore, the exemplary embodiments and the accompanying drawings disclosed in the present invention are used to not limit but describe the technical spirit of the present invention and the scope of the technical spirit of the present invention is not limited by the exemplary embodiments and the accompanying drawings. The protective scope of the present invention should be construed based on the following claims, and all the technical concepts in the equivalent scope thereof should be construed as falling within the scope of the present invention.

What is claimed is:

1. A method for applying filters for dental CT imaging, the method comprising:
    acquiring a dental CT image using a dental CT apparatus;
    extracting a region where an artifact is to occur from the acquired dental CT image;
    applying a first filter to a region other than the extracted region in the acquired dental CT image; and
    outputting the dental CT image in which the artifact is unshown after the first filter is applied,
    wherein the extracting of the region where the artifact is to occur includes applying a second filter to the acquired dental CT image and inverting a gray level of the dental CT image to which the second filter is applied.

2. The method of claim 1, wherein the first filter is a high pass filter and no change occurs in a pixel in the extracted region of the dental CT image between the acquiring of the dental CT image and the outputting of the dental CT image.

3. The method of claim 2, wherein the region where the artifact is to occur corresponds to a region having the gray level less than a first value at a boundary of metal or a tooth when the first filter is applied to the acquired dental CT image.

4. The method of claim 1, wherein the extracting of the region where the artifact is to occur artifact region further includes, when the gray level of a pixel is less than a second value in the inverted image, changing the gray level of the pixel to a minimum value.

5. The method of claim 4, wherein in the extracting of the region where the artifact is to occur, when the gray level of the pixel is equal to or more than the second value in the inverted image, a region of the pixel is determined as the region where the artifact is to occur.

6. A non-transitory computer readable recording medium in which a program for executing the method of claim 1 is stored.

7. A program stored in a non-transitory computer readable recording medium for executing the method of claim 1.

8. A method for applying filters for dental CT imaging, the method comprising:
    acquiring a dental CT image using a dental CT apparatus;
    extracting a region where an artifact is to occur from the acquired dental CT image;
    applying a first filter to a region other than the extracted region in the acquired dental CT image; and
    outputting the dental CT image in which the artifact is unshown after the first filter is applied,
    wherein the extracting of the region where the artifact is to occur artifact region includes applying a third filter to the acquired dental CT image and inverting a gray level of the dental CT image to which the third filter is applied, and
    wherein the region where the artifact is to occur corresponds to a region having the gray level exceeding a third value at a boundary of field of view (FOV) when the first filter is applied to the acquired dental CT image.

9. The method of claim 8, wherein the first filter is a high pass filter and no change occurs in a pixel in the extracted region of the dental CT image between the acquiring of the dental CT image and the outputting of the dental CT image.

10. The method of claim 8, wherein the extracting of the region where the artifact is to occur further includes, when the gray level of a pixel is less than a fourth value in the inverted image, changing the gray level of the pixel to a minimum value.

11. The method of claim 10, wherein in the extracting of the region where the artifact is to occur, when the gray level of the pixel is equal to or more than the fourth value in the inverted image, a region of the pixel is determined as the region where the artifact is to occur.

12. A system for applying filters for dental CT imaging, the system comprising at least one processor configured to:
    acquire a dental CT image using a dental CT apparatus;
    extract a region where an artifact is to occur from the acquired dental CT image;
    apply a first filter to a region other than the extracted region in the acquired dental CT image; and
    output the dental CT image in which the artifact is unshown after the first filter is applied,
    wherein the at least one processor is further configured to apply a second filter to the acquired dental CT image, and invert a gray level of the dental CT image to which the second filter is applied, to extract the region where the artifact is to occur.

13. The system of claim 12, wherein the first filter is a high pass filter and no change occurs in a pixel in the extracted region of the dental CT image between the acquiring of the dental CT image and the outputting of the dental CT image.

14. The system of claim 13, wherein the region where the artifact is to occur is corresponds to a region having a gray level less than a first value at a boundary of metal or a tooth when the first filter is applied to the acquired dental CT image.

15. The system of claim 12, when the gray level of a pixel is less than a second value in the inverted image, the gray level of the pixel is changed to a minimum value.

16. A system for applying filters for dental CT imaging, the system comprising at least one processor configured to:
    acquire a dental CT image using a dental CT apparatus;
    extract a region where an artifact is to occur from the acquired dental CT image; and
    apply a first filter to a region other than the extracted region in the acquired dental CT image,
    wherein the at least one processor is further configured to apply a third filter to the acquired dental CT image and invert a gray level of the dental CT image to which the third filter is applied, to extract the region where the artifact is to occur, and
    wherein the region where the artifact is to occur is a region having the gray level exceeding a third value at a boundary of field of view (FOV) when the first filter is applied to the acquired dental CT image.

17. The system of claim 16, wherein the first filter is a high pass filter and no change occurs in a pixel in the extracted region of the dental CT image between the acquiring of the dental CT image and the outputting of the dental CT image.

18. The system of claim 16, wherein when the gray level of a pixel is less than a fourth value in the inverted image, the gray level of the pixel is changed to a minimum value.

* * * * *